July 7, 1931. W. L. MORRIS Re. 18,123
GREASE FEEDER
Original Filed Aug. 7, 1916 3 Sheets-Sheet 1
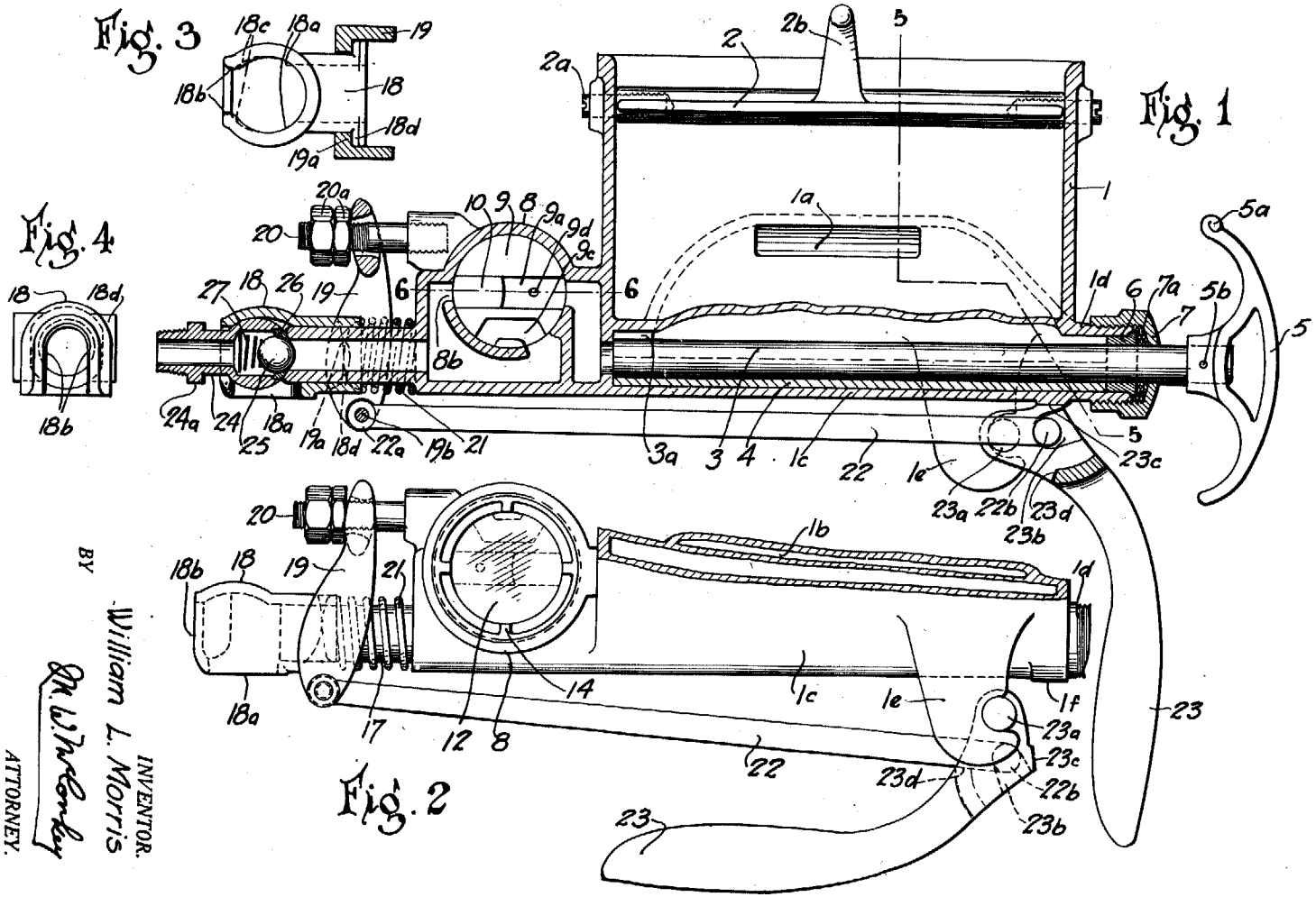
INVENTOR.
William L. Morris
BY
M. W. McCorkey
ATTORNEY.

July 7, 1931. W. L. MORRIS Re. 18,123
GREASE FEEDER
Original Filed Aug. 7, 1916 3 Sheets-Sheet 2
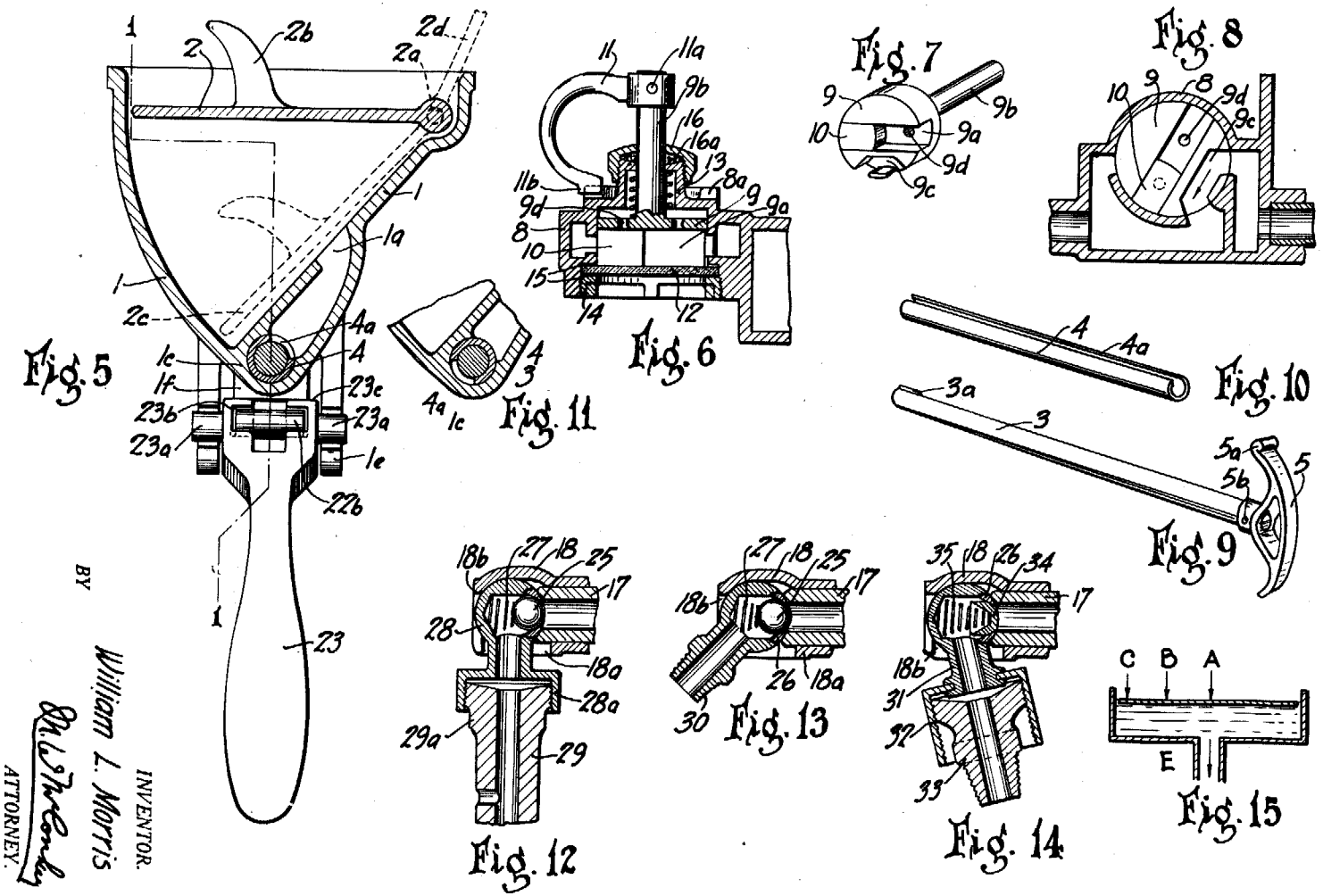
INVENTOR.
William L. Morris
BY
Chas. W. McCombs
ATTORNEY.

July 7, 1931. W. L. MORRIS Re. 18,123
GREASE FEEDER
Original Filed Aug. 7, 1916 3 Sheets-Sheet 3
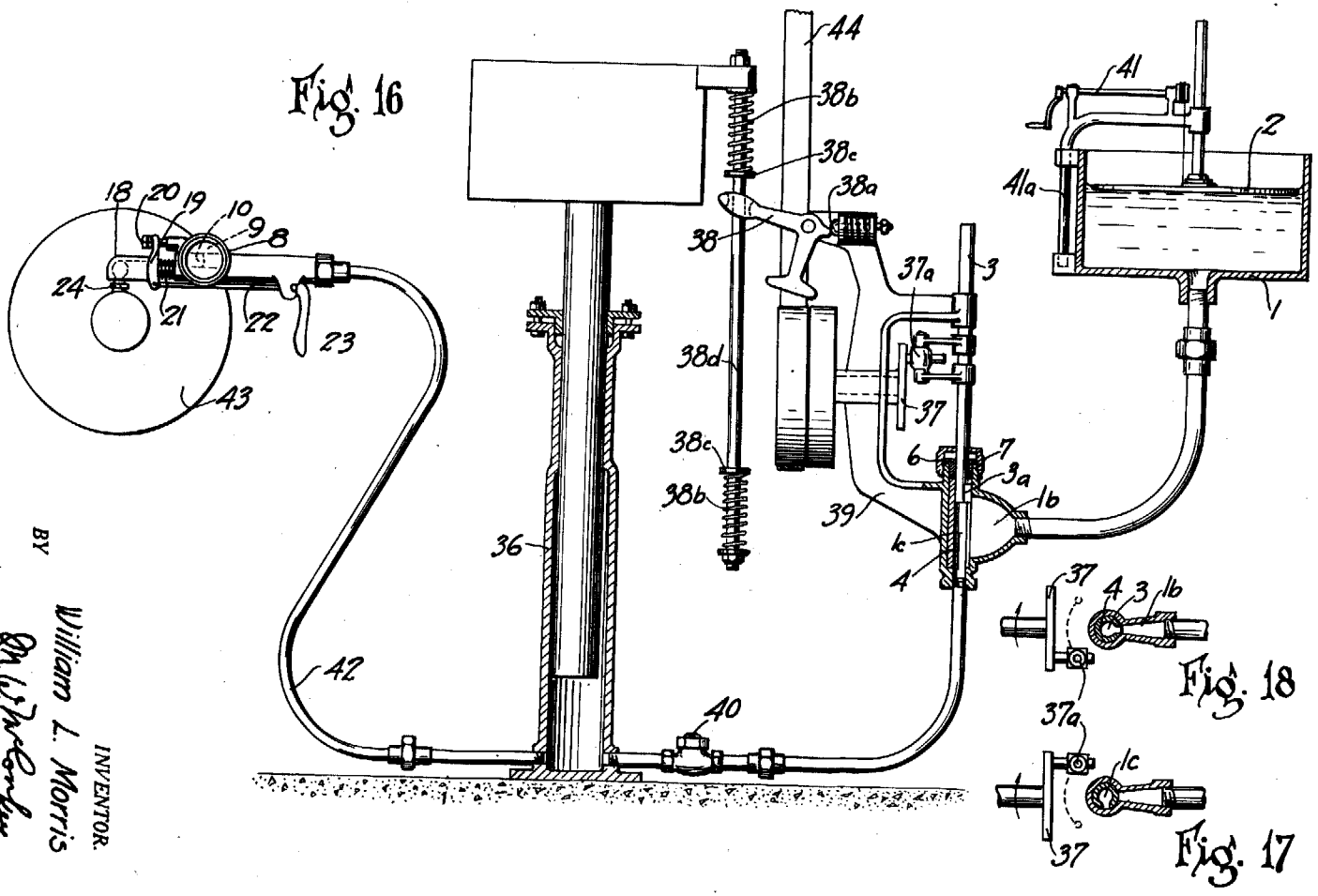
INVENTOR.
William L. Morris
BY
Dr. W. McCorkey
ATTORNEY Reissued July 7, 1931

Re. 18,123

UNITED STATES PATENT OFFICE

WILLIAM L. MORRIS, OF WILMETTE, ILLINOIS, ASSIGNOR TO BENDIX AVIATION CORPORATION, OF NEW YORK, N. Y., A CORPORATION OF DELAWARE

GREASE FEEDER

Original application filed August 7, 1916, Serial No. 113,653. Renewed February 11, 1929. Original No. 1,749,830, dated March 11, 1930. Application for reissue filed March 10, 1931. Serial No. 521,524.

This invention relates particularly to a grease feeder for filling the grease cups of an automobile, but, of course, it may have a more general application wherever it may be used.

The principal object of the invention is to provide a grease feeder with which the grease cups or devices may be filled without any loss of grease and in the quickest possible time.

A successful grease feeder should be able to accomplish a number of important results; it should be of such construction that a central system could be employed feeding grease from a pipe line under pressure or a hand operated system, both of which can be easily and quickly attached and successfully used. A central system should be able to fill four or five grease cups a minute; a hand sys'em should be able to fill two or three cups per minute. Either the hand or the pressure feed should be arranged to feed a predetermined amount at each feeding; the central system at about 200 pounds pressure, the hand system at about 50 to 75 pounds pressure, both systems having means of showing whether the grease has been fed; any feeder should have such a construction that grease is prevented from oozing out when disconnected from the grease cup due to the air re-expanding, and there must be no pressure at the discharge connection when the grease feeder is detached. The connection to which the grease feeder is attached should permit of connection from any one of several angles on account of the many positions in which cups are placed on a car. The form of grease feeder should be such that an exact alignment of the feeder is not necessary in order to make the connection; the form of grease feeding connection should be one which will permit a considerable movement of the grease feeding device without imposing too great a strain on the small connections of the grease cups. The attachments for the grease cups should be uniform in size so that the feeder can readily be attached thereto regardless of the size or make of the grease cup itself. These are only a few of the requirements for a successful grease feeder and the present device is believed to answer all these requirements and many others as will hereinafter be set forth.

The invention consists in the features of novelty in the construction, combination, and arrangement of the several parts.

In the accompanying drawings, Figure 1 is a longitudinal section taken on the line 1—1 of Figure 5; Figure 2 is a view in elevation of the lower part of the construction shown on Figure 1; Figure 3 is a view looking at the under side of the movable clamp member; Figure 4 is an end view of the clamp member; Figure 5 is a transverse section taken on the line 5—5 of Figure 1; Figure 6 is a plan section of the measuring device taken on the line 6—6 of Figure 1; Figure 7 is a perspective of the rotatable measuring member and its transversely movable plug; Figure 8 shows the measuring device of Figure 7 with its by-pass communication; Figure 9 is a perspective of the hand plunger; Figure 10 is a perspective of a rotatable sleeve valve; Figure 11 is a cross sectional view through the plunger and sleeve when the grease port is shut off; Figure 12 shows one grease plug attachment; Figures 13 and 14 show other forms of grease plug attachments at different angles; Figure 15 is a diagrammatic view illustrating grease handling by suction. Figs. 16, 17 and 18 are views showing a power grease feeder.

This device is intended to store a quantity of grease and then deliver it in small quantities to different bearings or grease cups, and instead of the grease storage being in each of the several grease cups, which must be screwed down to feed the grease, the storage is in the feeder. Also, instead of feeding grease from the grease cups by manipulating them and refilling them when empty, this device is attached directly to the bearing to be supplied with grease and the grease is fed from it, the grease feeder being refilled instead of the cups. It is difficult to feed grease slowly and automatically for a considerable time, particularly with a device like the ordinary grease cup and it is for such bearings as require only a small amount of grease that this device is particularly suited. Grease cups become fouled with dirt and impurities so that they are difficult to manipulate and when there are many cups there is much labor involved in adjusting and filling them. A purpose of this device is to save labor, however, it will also save grease and avoid admitting much of the dirt and impurities that get into separate grease cups. This feeder can be quickly attached, the grease forced to the bearing, and the feeder detached. The various details employed are chiefly for the purpose of saving labor.

This feeder comprises, an attaching device, a grease feeding mechanism, a quantity measuring mechanism, and a grease storage and suction feeding mechanism. In some cases the entire combination of devices is necessary, while in some other cases a power pump may be used to supply grease under pressure in connection with the attaching and measuring mechanisms.

Grease is a peculiar substance to handle and until its characteristics are pointed out, new and novel details employed in this device will not be sufficiently appreciated. Grease being a solid or rather a semi-solid, more or less plastic, will not flow unless it is forced by pressure. If suction is applied to a chamber or receptacle containing grease, air will pass through the grease where there is least resistance. If air is prevented from entering at the point of least resistance then the suction will be greatest at this point and by increasing the length of travel that the air would have to take, the greater will be the suction at points of least resistance which are covered actually to prevent air from entering. This is more clearly shown by referring to Figure 15 in which the disk D is forced down on the grease in a suitable receptacle to exclude air from the mass of grease so that the pressure per unit of area at the point A would, when suction is applied to the outlet E, be much greater than necessary to move the grease, gradually becoming less at the point B and the lowest possible pressure at the edge of the disk C; really less than that required to move the grease. Stating this a different way, it is the combined pressure on the entire disk D caused by the suction, that is sufficient to withdraw the grease but the pressure at the edge of the disk is too low for air to pierce thru the body of the grease. Thus, although the grease may be almost entirely removed from such a receptacle by suction, the length of travel of the air thru the grease would be so great that more pressure would be required to puncture the grease than to withdraw it from the suction opening.

Another consideration in handling grease is the difficulty of keeping air out of the grease container; such air as would be encircled or pocketed by grease while placing it in the container. When air and grease are confined together the measuring device will not measure accurately; furthermore, the pockets of air re-expand when suction and pressure are alternated, and when detaching the feeder from the bearing the compressed air may eject grease at the connecting fittings. The shallower the container, and the larger its filling opening, the less air will be pocketed while filling the container with grease. It is further desirable to employ the form shown to serve this valuable purpose for the form of the container makes it possible to insert or fill it with grease without pocketing air, the form and shape of the lid or cover makes it practicable to suck grease from the container without air piercing thru the grease. This device also relieves pressure on the grease at the point of connection before disconnecting therefrom.

In feeding grease to different bearings some will require much pressure to force it into the bearings while others will require very little pressure. When only a small amount of grease is to be supplied no hand opening or closing of a valve or hand control of the amount of movement of the grease forcing ram can be relied upon to measure out a predetermined quantity of grease. It requires a device that will measure in cubical contents at any pressure or velocity, positively closing when the predetermined amount has been measured.

To prevent grease from escaping at the connecting members it is necessary to have a self closing valve so that any confined pressure in the bearing will not eject grease when the parts are separated, or when the joint is disconnected. The pressure at the grease feeder connection, that is, at the end of the feeder itself should first be below atmospheric pressure to prevent the grease from escaping from the open end of the feeder and the feeder should then be opened to the atmosphere before disconnecting it; this insures that the pressure is not above the atmosphere so it will discharge grease, and at the same time not enough below the atmospheric pressure to draw grease back into the feeder and allow air to enter which might be forced into the next bearing filled. It has been shown in practise that the feeder herein shown and described will do all of the above things and answer all of the requirements for a successful grease feeder.

In the accompanying drawings the numeral 1 designates generally the grease receptacle having the form shown in cross section in Figure 5 throughout its entire length as shown in Figure 1. This grease receptacle has an opening $1^a$ through which grease is sucked from the receptacle, the sides of the opening being spaced, from the points where air may enter, approximately the same amount or distance in all directions. The resistance against air leakage is made as near the maximum as possible for all points.

From the opening $1^a$ a passage $1^b$ extends which is the grease inlet to the cylindrical portion $1^c$ of the receptacle casing. A lid or cover 2 is pivoted at one side of receptacle 1 on a pivot $2^a$ and serves a far more valuable purpose than merely to keep dirt out of the grease receptacle. The cover proper is spaced from the edge and ends of the receptacle and is pressed down firmly on the grease after the receptacle has been filled; thereby forcing air and some grease outwardly around the edges and leaving the contents of the receptacle solid grease from which air has been excluded with the cover bearing firmly upon it. A handle $2^b$ affords means for raising and lowering the cover which is shown on Figure 5 by the dotted outline $2^d$ in its raised position and by the dotted outline $2^e$ in almost its lowest position.

Rotatable in a cylindrical portion $1^c$ of the feeder casing is a valve sleeve 4 having a longitudinal slot $4^a$ which extends its entire length. In this sleeve a ram or plunger 3 is movable which has at one end a block $3^a$ adapted to fit in the slot $4^a$ so that the outer radius of the block is the same as that of the sleeve. The plunger can therefore be moved longitudinally without moving the sleeve and when the plunger is rotated the sleeve rotates also. At the other end of the plunger is a handle 5 flat at one side but having a distinguishing scroll $5^a$ on the other to designate the position of the port in the sleeve valve 4. This handle is secured to the plunger by a pin $5^b$. At the outer end of the plunger is a retainer gland 6 positioned close to the outer end of valve sleeve 4 allowing only enough clearance so the sleeve will rotate. This gland is formed with a shoulder to prevent its being pressed in against sleeve 4 and a packing nut 7 with interposed packing $7^a$ prevents leakage around the gland and retains the plunger and the sleeve 4 in place. In operation the plunger 3 can be withdrawn until the block $3^a$ comes in contact with the gland 6. The boss $1^d$ to which the gland and packing nut are attached is shown as an integral part of the receptacle 1. The bore at the discharge end of the cylinder is sufficiently smaller than the diameter of the valve sleeve 4 to provide a shoulder against which this end of the sleeve abuts and rotates and also form a stop against which the inner end of piston 3 may contact to limit its travel in this direction.

The case of the measuring device is designated generally by the numeral 8 and may be a separate and distinct part attached to the receptacle 1 instead of an integral part as shown in Figure 1. In this casing 8 is a bore in which a rotatable member 9 is movable. This member 9 has a slot $9^a$ into which the grease passes to be measured, and a measuring block 10 slidable therein, the length of the block determining the amount of grease to be ejected with each half turn of the member 9. The stem $9^b$ extends to the outside of the measuring device to permit movement thereof. To this stem a handle 11 is attached by means of a pin $11^a$, with a lower extremity $11^b$ adapted to make contact with stops $8^a$ projecting from the casing.

In front of the rotatable member 9 is a glass disk 12 against which the rotatable member 9 is pressed by means of a spring 13. The glass disk is held in place with a retaining ring 14 and made tight with packing rings 15. The stops $8^a$ at the back of the measuring device are so placed that the lever 11 can be turned half way and back again to make the ends of the slot $9^a$ register with openings in the casing 8 for discharging the grease. A packing nut 16 and packing $16^a$ prevents leakage around the stem $9^b$. This measuring device has a by-pass $9^c$ whereby the grease which passes thru need not be measured. This by-pass port $9^c$ can be turned to the position shown in Figure 8 thereby shutting off the port or slot $9^a$. In releasing the lower end $11^b$ of the lever 11 from engagement with stops $8^a$, the rotatable member 9 is moved away from the glass disk 12, compressing the spring 13 and allowing the end $11^b$ to ride on top of the stops $8^a$ until the position shown in Figure 8 is reached. If this position is to be maintained for some time, the stops $8^a$ would be notched at the by-pass position so that the rotatable member 9 will be locked in this position and allowed to return to its normal position against the glass 12. In the bottom of the slot $9^a$ of this member 9 are holes $9^d$ for relieving pressure between the rotatable member 9 and the casing 8, when the rotatable member is drawn back to disengage its handle from the stops.

When the floating piston or plug 10 is at one end of the slot $9^a$ as shown by Figure 1 it closes a discharge passage $8^b$; the piston is larger than the passage and closes over it tightly much the same as a check valve. In Figure 2 the rotatable member 9 is turned half way around with the piston or plug 10 in the same position in slot $9^a$, as it was in Fig. 1, and ready to take its travel of a stroke and eject as much grease as lies between the piston and discharge passage $8^b$. The glass sight 12 shows clearly the position of the piston, at all times, and whether grease has traveled thru the measuring port, and also shows if air is in the charge of grease. The quantity of grease discharged each stroke can be varied by varying the length of the floating reciprocating piston 10.

At the discharge end of the measuring device casing is a nozzle 17 in communication with the passage $8^b$ and with the discharge from the by-pass $9^c$ so that either a measured or unmeasured quantity of grease can be discharged therefrom. Slidable on this nozzle is a clamping member 18 which has an attaching extremity $18^a$ open from below and a reduced opening $18^b$ at the end shown by Figures 3 and 4. These openings are proportioned to receive a spherical end of a ball fitting 24 as shown in Figure 1, so that the fitting can be clamped between the member 18 and the end of nozzle 17, a spherical bearing face $18^c$ being formed in the clamping member as shown in Figure 3 and the end of the nozzle 17 having a spherical seat.

Extending from the clamping member 18 are ears $18^d$ as shown in Figures 1, 3, and 4, by which the member is pulled toward the nozzle 17. A pull lever 19 has legs $19^a$ which bear against the ears $18^d$, the lever being like an inverted U with the upper end loosely engaged by the stud 20 upon which are adjusting nuts $20^a$. The ears $18^d$ (Fig. 4) fit between the legs of the lever 19, which extend down over the nozzle 17 and are provided at the lower ends with holes thru which a pin $19^b$ extends. Ears $18^d$ are straight sided and may engage the inner sides of the legs of the lever 19, thereby preventing the clamping member from rotating out of position. For nearly all connections, the clamping members 18—19—22 and 23 bear only on one side of their bearing and a spring 21 is therefore placed at the nozzle end of the clamping member tending to keep bearings in contact. These connections can be made with bearings as $22^a$ and, would bear against the opposite sides of the different bearings, dispensing with the spring, but this would not be as satisfactory as the construction shown.

A link or pull rod 22 has a long eye $22^a$ at one end, thru which the pin $19^b$ extends, and the other end $22^b$ is T-shaped forming a bearing part at each side. An operating lever 23 is formed with a pivot leg $23^a$ at each side, which has a bearing in recesses of legs $1^e$, preferably formed integral with the bottom of receptacle 1. In this lever 23 are bearings $23^b$ for the T-headed extremities $22^b$ of link 22, so that the movement of the lever 23 carries the T-head past the line thru the center of the eye $22^a$ of the pull rod and the bearing $23^a$ of the lever, until a shoulder $23^c$ of the lever 23 abuts a stop or projection $1^f$ on the bottom of the receptacle. The limit of travel in the other direction is determined by the engagement of a shoulder $23^d$ of the lever with the pull rod 22, clearly shown in Figures 1 and 2.

An end ported fitting 24, clearly shown in Fig. 1, has a threaded connecting end and a hexagonal portion $24^a$ for attaching it. In the port is a ball valve 25 pressed against a valve seat 26 by a spring 27. The seat 26 is inserted and held in a shouldered recess formed about the opening into the fitting. In Figures 12, 13, and 14 different forms of ball fitting are shown; the port of the ball or spherical fitting 28 is at the side in Fig. 12, the numeral 29 designating generally a pin or bearing for receiving lubricant, with a grease cup end $29^a$ threaded into a fitting end $28^a$; in Fig. 13, a member 30 is similar to the fitting shown in Fig. 1 with the exception that the port is at 45 degrees to its longitudinal axis. In Fig. 14, the ball fitting 31 has a port at a special angle, and has its lower end secured to a standard grease cup cap 32, the stationary part of the grease cup being designated at 33. In this last structure is a formed valve 34 having a pointed spring 35 bearing inside of the valve.

These modified forms are shown as they can all be used with a clamping device, the spherical form being superior to others, as it allows connection from almost any angle, and is easily cleaned or wiped off. Furthermore a slight movement of the grease feeder is permissible with the spherical connection without placing a strain on the fitting; the clamping member will slip on the ball up to a point such that it bears on the neck; the neck however, would be considerably smaller than the opening $18^b$ shown in Fig. 4.

In operation, cover 2 is raised to the position $2^d$ and with a small paddle or putty knife grease is placed in one side of receptacle 1, and as more is added and squeezed down into the receptacle, it is filled from one end to the other. This method of filling expels the air. When the receptacle is full, the cover is forced down firmly, squeezing out the top air together with some grease. The surplus grease is cut away with the putty knife and put back into the grease pail or barrel and the feeder is ready to use after first taking a stroke with the plunger 3 and discharging grease back into the pail to see that the grease is filled in solidly.

With a rag in right hand to wipe off outer end of attachments, and filler in left hand, the clamping member 18 is placed over a spherical connection and the clamp lever 23 is pulled up to its stop with the left hand. With the right hand the grease is drawn into the sleeve 4 by moving plunger 3 outwardly and with the scroll on handle $5^a$, standing up. At the end of the outward stroke the handle 5 is turned half way around with the scroll at bottom which closes the longitudinal port $4^a$, and the plunger is moved in, forcing grease from the sleeve into the measuring device. To disconnect, the lever 23 is pushed back with the left hand clamping member 18 is disengaged and is ready to connect to the next fitting.

If the measuring device is being used, then while going from one bearing to the next, the handle 11 is turned half way around against its other stop $8^a$. The grease will hold the cover 2 firmly by suction so it will not open even when placed upside down. When the receptacle is empty, the increased resistance will be noted when pulling out the plunger as the cover 2 would be at the end of its travel.

Where much grease is to be handled, the plunger and receptacle would be stationary and much larger with flexible metallic hose run to the measuring and clamping device. The pump in this case would be power driven with a weighted accumulator arranged to cut out the pump drive when full and then throw it in when nearly empty, as shown by Figs. 16, 17 and 18. A weighted accumulator 36 is connected through a check valve 40 with the grease supply passage $1^b$, and leading from the accumulator is a flexible hose having an attachment for supplying grease to a part 43, the attaching parts being the same as those already described. A pump frame 39 has a tight and a loose pulley mounted thereon with a crank 37 connected to the tight pulley, and with a bearing head $37^a$ attached to the plunger rod 3 which is longitudinally movable in and rotatable with the valve sleeve 4. A belt shifter lever 38 has a button $38^a$ pressed by means of a spring against a projection on the lever to hold it in one of two positions. One end of lever 38 engages a belt 44 for moving it upon the tight or loose pulley, and extending through the other end of the lever 38 is a rod $38^d$ carried by the accumulator, at each end of which is a washer $38^c$ pressed against a shoulder on the rod by a spring $38^b$. When the accumulator falls the upper washer engages lever 38 and the upper spring $38^b$ is compressed until the pressure of the spring-pressed button $38^a$ is overcome, throwing the belt shifter to move the belt 44 to the tight pulley. This causes the operation of the plunger 3 and the valve sleeve 4. Fig. 17 shows the position of these parts on the down or discharge stroke, and Fig. 18 shows the position of the parts on the top or suction stroke, drawing the grease from the passage $1^b$ and from the receptacle 1. An operator 41 comprising a hand crank, drum and lifting cable, may be used to raise the plate 2, the operator being mounted upon a davit crane $41^a$ so that the cover 2 can be swung clear of the receptacle 1.

If a central service station system is used, with a power pump to discharge the grease; the grease cups under the car, such as for brakes, rear axle swivel, universal joint, and the like, should point to such a position that a man in a cleaning pit beneath the car would find them easy of access. A piped pressure system for discharging grease requires a pump to create a pressure of about 200 pounds.

Grease can not be readily placed in the small end of a long container, and when so placed, air is apt to be confined between each application of grease, while it is being pressed in. A shallow container with a large opening can be filled much more readily and air kept out entirely, if grease is carefully placed so that a volume of air is not pocketed with the grease.

Where a certain movement, such as the travel of a ram determines the amount of grease fed, possibly no other device would be required to measure it; but where fed from a pipe line some measuring device would be necessary. With either the hand or power form, the measuring device should have a by-pass to permit an unmeasured quantity of grease to be discharged.

That part of the feeding device connected to the grease receiving projection or fitting should be of such construction that it can be quickly attached and detached, preferably by lever manipulation, as shown, rather than by a screw, and when the lever is drawn up tight it should hold to the fitting even if the hand is removed, for in the manipulation of the grease feeding plunger with one hand, the other would be unsteady, relieving pressure at the connection and allowing a leakage. The clamping device should have a limit to its clamping and releasing travel to avoid unnecessary strain on the parts. A wear take-up is required so that if there is not sufficient tension it can be readily adjusted, and when so set, will not shift out of adjustment. The attachments are accurately made to an established form, with very small allowance for variation. The adjustment of the clamping device is used to take up the wear in the parts, not to cover inaccuracy or variations in the parts. The present invention fulfills all of these requirements.

I claim:

1. In a grease feeder, the combination with a receptacle therefor, of means for sucking the grease from said receptacle, a loose cover plate over the grease all the edges of which in all of its operating positions are sufficiently spaced from the suction to prevent air from piercing the grease, the cover plate being moved by the withdrawal of grease.

2. In a grease feeder, the combination with a receptacle and a suction outlet at the bottom of the receptacle, of a plate fitting loosely within the receptacle the edges of which are spaced substantially an equal distance from the suction point and sufficiently farther than the shortest path through the grease in all of its operating positions to prevent air from piercing the grease until the container is empty.

3. In a grease feeder having a suction opening the entrance to which is adapted to be surrounded by the grease, a cover plate adapted to rest on the grease and block the direct path from the suction opening to the atmosphere, the interior portion of the cover plate being sufficiently close to the suction opening so that the high suction pressure at the center of the plate together with the gradually decreasing pressure from the center to the edge are sufficient to move the grease toward the suction opening, the edges of the cover plate extending away from the suction opening sufficiently so that at the edges the pressure is too low for air to pierce the grease in any operative position of the cover plate.

4. Means for delivering a semi-solid substance in an air-free condition comprising a source of supply, an outlet therefrom, means for creating a pressure differential between the outlet and the surface of the substance to withdraw the substance through the outlet, said substance being of such a consistency that fluid pressure on its surface will pierce the substance at its point of least resistance and break the pressure differential, and a covering member adapted to contact with the surface of the substance and extend laterally from said point of least resistance a sufficient distance effectually to prevent piercing of the substance and to cause it to flow solidly through said outlet.

5. In a grease dispensing device, a receptacle open to air pressure having an outlet therefrom and a follower member adapted to lie on the surface of the grease therein and extending laterally with respect to said outlet sufficiently to prevent air from piercing the grease in any operative position of the follower.

6. In a grease dispensing device, a wide, shallow receptacle open to air pressure having an outlet therefrom and a follower plate adapted substantially to cover the surface of the grease therein and extending laterally with respect to said outlet sufficiently to prevent air from piercing the grease in any operative position of the follower.

7. As a grease dispensing device, a receptacle open to atmospheric pressure having a suction outlet therefrom and a follower member adapted to lie on the surface of the grease therein and extending laterally with respect to said outlet sufficiently to prevent air from piercing the grease in any operative position of the follower.

8. In a grease dispensing device, a receptacle open to atmospheric pressure having a suction outlet therefrom and a follower member adapted to lie on the surface of the grease therein and extending laterally with respect to said outlet sufficiently to prevent air from piercing the grease in any operative position of the follower, said follower being retained by the atmospheric pressure in contact with the grease in all operative positions of the follower and container.

9. As a grease dispensing device, a receptacle open to air pressure having a follower member adapted to engage the surface of the grease therein, said follower being held against said surface by the pressure of the air in all operative positions of the follower and container, and means for maintaining said follower substantially flat on said surface.

10. Means for handling grease including a grease container, a follower in the container adapted to engage the surface of a body of grease in said container, and aspirating means for the grease connected with said container and located substantially symmetrical with respect to said follower and sufficiently nearer the center of the follower than the edges so that the follower prevents air from piercing the grease in any operative position of the follower.

11. Means for handling grease including a grease container, a follower in the container adapted to engage the surface of a body of grease in said container and aspirating means in contact with said mass of grease connected with said container and arranged sufficiently nearer the center of the follower than the edges thereof in all operative positions of the follower so that said follower prevents air from entering the aspirating means.

12. In a grease container and dispenser, a receptacle having a substantially uniform internal right section, and a follower adapted to loosely fit within said receptacle in contact with the surface of the grease and cause the grease to be extruded under atmospheric pressure, said follower being arranged to prevent the air from penetrating the grease during the process of extrusion.

13. In a grease container and dispenser including a comparatively wide and shallow receptacle having a substantially uniform internal right section, a follower adapted loosely to fit within said receptacle in contact with the surface of the grease and cause the grease to be extruded under atmospheric pressure, said follower being arranged to prevent the air from penetrating the grease during the process of extrusion, and means for maintaining the follower substantially flat on the surface of the grease.

14. As a grease dispenser portable grease container comprising a receptacle having a substantially uniform internal right section and a follower for the grease adapted to fit within the receptacle, said follower being maintained in contact with the grease by atmospheric pressure irrespective of the position of the container.

15. In a grease dispenser portable grease container comprising a receptacle having a substantially uniform internal right section and a follower for the grease adapted to fit within the receptacle, said follower being formed to allow any air that may be trapped thereunder to escape when the follower is externally pressed against the surface of the grease.

16. In grease dispensing apparatus, portable grease container comprising a receptacle having a substantially uniform internal right section, and a follower for the grease adapted to fit within the receptacle and engage the surface of the grease, said follower being adapted to traverse the container under the action of air pressure and force out substantially all the grease therefrom.

17. In grease dispensing apparatus, portable grease container comprising a receptacle having a substantially uniform internal right section and a follower for the grease adapted to fit within the receptacle and engage the surface of the grease, said follower being adapted to traverse the container when the grease is removed therefrom by aspiration, and force out substantially all the grease therefrom.

18. In a grease dispensing apparatus, portable grease container comprising a receptacle having a substantially uniform internal right section and a follower for the grease adapted to fit within the receptacle and engage the surface of the grease, said follower being adapted to traverse the container under the action of air pressure and force out substantially all the grease therefrom, said pressure serving to maintain the follower in contact with the surface of the grease in all operative positions of the follower and container.

19. In a grease feeder, a grease receptacle, a rotatable slotted sleeve open at one end and having a longitudinal slot to communicate at the side thereof with the receptacle; and ejecting means fitting in the sleeve and in the slot and movable longitudinally therein so that it will discharge grease from the end of the sleeve when the slot is rotated out of register with the receptacle and to withdraw grease from the receptacle through the slot when it is rotated to open thereinto and the ejecting means is reversely moved.

20. In a grease feeder, a grease receptacle, a slotted sleeve open at one end and rotatable in the bottom of the receptacle, and a plunger reciprocable in the sleeve to discharge grease from the open end and rotatable with the sleeve to move the slot thereof in position to withdraw grease from the receptacle through the side of the slot when the plunger is moved in the reverse direction.

21. In a grease feeder, a grease receptacle, a circular bore at the bottom of the receptacle communicating throughout its length with the receptacle, a slotted sleeve rotatable in said bore but fixed against longitudinal movement, and a plunger movable in the sleeve to withdraw grease from the receptacle having a projection engageable in the slot of the sleeve for rotating the sleeve when the plunger is rotated to close and open the slotted connection at the side thereof with the receptacle.

22. In a grease feeder, a grease receptacle, a rotatable slotted sleeve open at one end and having a longitudinal slot to communicate at its side with the receptacle, and ejecting means fitting in the sleeve and in the slot and movable longitudinally therein so that it will discharge grease from the end of the sleeve when the slot is rotated out of register with the receptacle and will withdraw grease by suction from the receptacle upon its return movement when the slot communicates with the receptacle.

23. In a grease feeder, a grease receptacle, a slotted sleeve having an open discharge end and rotatable in the receptacle, a plunger movable longitudinally in the sleeve and rotatable with it, the movement of the plunger in one direction discharging grease from the open end when the slot is turned away from the receptacle, means to close the discharge from the sleeve whereby the return movement of the plunger will suck grease from the receptacle into the sleeve when the latter is turned by the plunger so that the side of its slot opens into the receptacle.

24. In a grease feeder, the combination with a receptacle having a cylindrical bore through the ends of the receptacle communicating therewith through substantially the whole length of the bore, a slotted sleeve rotatable but fixed against longitudinal movement in the bore, and reciprocable and rotatable means in said sleeve for rotating the sleeve to open and close the port formed by its slot and for withdrawing grease from the receptacle through the slot into the sleeve and discharging it from the end of the sleeve by the reciprocable movement of said means.

25. In a grease feeder, a casing having a longitudinal discharge port, a sleeve with a corresponding port extending lengthwise thereof to draw grease therethrough from the casing and being open at one end, a plunger movable in the sleeve to discharge grease at the open end, and having means for engaging and rotating the sleeve, a shut off valve beyond the discharge end of the sleeve to allow the plunger to draw grease into the sleeve upon its return movement, and means attached to the plunger to show the position of the sleeve port.

26. In a grease feeder, a cylindrical casing with a port along its entire length, a sleeve with a slot forming a lengthwise port rotatable in the cylinder, a plunger slidable in the sleeve, and a projection at the inner end of the plunger which engages in the slot of the sleeve to rotate the sleeve when the plunger is rotated moving the slot into and out of register with the cylinder port, the plunger sucking grease from the receptacle through the slot.

27. In a grease feeder, a pump cylinder with a port along its side and a discharge opening at the end, a sleeve with a slot along its side rotatable in the cylinder, a plunger fitting the sleeve and operative to draw grease into the sleeve through the slot with a block at its end to fit the slot in the sleeve, packing at the outer end to retain the sleeve against the opposite end of the cylinder, and means for securing the packing in position.

28. In a grease feeder, a cylindrical pump casing, said pump casing having a port along its side and a smaller discharge opening at one end thereof, a sleeve fitting in the casing having a longitudinal slot to register with said port and larger in external diameter than the smaller discharge opening, a plunger movable in the sleeve to draw grease through the port and said slot and to eject grease from the said opening, a valve at the discharge opening, and packing means for holding the sleeve in the casing and for making a fluid-tight joint with the plunger at the end opposite the valve.

29. In a grease feeder, a source of grease supply, a grease pump having a slotted sleeve to receive grease therefrom, a plunger reciprocable in the sleeve to discharge grease at one end and rotatable with the sleeve to move the slot thereof in position and to withdraw grease therethrough from the source of grease supply and valved means to close the discharge before the plunger is moved to fill the sleeve.

30. A grease feeder having a cylindrical bore member communicating with a source of grease supply, a slotted sleeve open at one end and rotatable in the bore but fixed against longitudinal movement, and a member reciprocable in the sleeve with engaging means in the slot for rotating it to open and close the port formed by the slot and for withdrawing grease from the source of supply through said slot and discharging it from the end of the sleeve by the reciprocable movement of said member.

31. In a lubricant gun, a tube, a lubricant reservoir disposed substantially to one side of said tube and secured relative thereto, said reservoir and tube having intercommunication for passage of lubricant from the reservoir into said tube, a lubricant follower in said reservoir, and means for ejecting lubricant from said tube.

32. In a lubricant gun, a tube, a lubricant reservoir disposed at one side of said tube as respects the main body of lubricant in the reservoir and the axis of said tube, means in said reservoir for preventing cavitation of lubricant therein, and a plunger in said tube for ejecting lubricant therefrom.

33. In a lubricant gun, a tube, a shallow lubricant reservoir disposed at one side of said tube and secured thereto, said reservoir and tube being connected by a passage for flow of lubricant from the reservoir into the tube, a plunger in said tube for ejecting lubricant therefrom, lubricant following means in said reservoir, and a valve between said tube and reservoir for preventing return of lubricant to said reservoir from said tube through said passage.

34. In a lubricant gun, a barrel, a lubricant supplying metal container laterally secured intimately to said barrel by a substantial portion of the length of its bottom adapted to supply lubricant from said container to said barrel, and means to eject lubricant from an end of said barrel.

35. In a lubricant gun, a barrel, a lubricant supplying metal container laterally secured to said barrel by a straight portion of its bottom at a substantially right angle to the axis of said container, said container adapted to supply lubricant to said barrel, and compressor means having a grip adapted to eject lubricant from an end of said barrel.

36. In a lubricant gun, a barrel of substantially uniform wall thickness, a lubricant containing metal container intimately connected to said barrel along a portion of its bottom extending parallel to the axis of said barrel, means to eject lubricant from said barrel and a dispensing nozzle secured to an end of said barrel.

37. In a lubricant gun, a barrel of substantially uniform wall thickness, a lubricant containing metal container intimately connected to said barrel, laterally thereof, by a portion of its bottom extending parallel to the axis of said barrel, grip means projecting from an end of the barrel and revoluble relative thereto and manually operable to eject lubricant from said barrel, and a dispensing nozzle secured to the other end of said barrel.

38. In combination with a slender lubricant dispensing barrel, lubricant dispensing mechanism longitudinally reciprocable therein, a container having a wall for supplying lubricant through said wall thereto, said wall directly intimately engaging a lateral side of said barrel over a substantial distance between the ends thereof, said container being rigidly secured by said wall to said barrel, and a rotatable handle projecting from a posterior end of said barrel.

39. In a lubricant gun, a relatively long dispensing barrel, a metal lubricant receptacle having a depth considerably less than a dimension transverse its depth, secured integrally and intimately by a wall along a side of the barrel, substantially remote from the dispensing end of the barrel, in combination with a handle rotatably secured to the barrel.

40. In a lubricant gun, a relatively long dispensing barrel, a metal lubricant receptacle having a depth considerably less than a dimension transverse its depth, secured integrally by a wall directly to the barrel, substantially remote from its dispensing end, in combination with a handle rotatably secured to the barrel, and a lubricant follower disposed in said receptacle, said receptacle and barrel having intercommunication.

41. The combination of a lubricant compressor of the type employing a compressor piston rod projecting posteriorly from a compressor barrel and having a thrust hand grip on the posterior end of the rod, of a lubricant reservoir for said compressor in the form of a shallow receptacle rigidly affixed to and along a portion of the side of the barrel intimately and directly, said thrust hand grip being freely rotatable relative to said barrel and receptacle.

42. The combination with a grease feeder, of a measuring device having an oscillatory plug with a grease passage reversible thereby, and a plug slidable therein, a transparent cover for the device to observe the movement of the grease and the plug, and means for applying grease under pressure to one end of the passage for moving the plug to eject a predetermined amount of grease from the other end of the passage.

43. In combination, a grease holding receptacle, means for withdrawing and discharging grease therefrom, and a measuring device having an oscillatory plug with a grease passage reversible thereby and connected to said means, a transparent cover for observing the movement of the grease in said passage, the measuring device being actuated by pressure from the discharging means upon the grease in the passage.

44. In combination, a grease holding receptacle, means for discharging grease therefrom, a measuring device comprising an oscillatory plug having a passage reversible thereby and means therein actuated by the pressure of discharging grease for limiting the amount of grease discharged at each movement of said plug, and means to render visible the position of the device and the movement of grease in the passage.

45. The combination of a grease feeder having a discharge port, and a measuring device connected to the discharge passage comprising a rotatable encased member with a rectangular transverse slot movable to register either end with the discharge port, a piston slidable in the slot under the pressure of the grease, and manual means to rotate the said member to reverse the ends of the slot.

46. The combination of a grease feeder having a discharge port, of a measuring device comprising a circular casing communicating with said port, a rotatable member having a transverse rectangular slot to register with said port, the said casing having an outlet port opposite the said discharge port, a plug larger than said ports slidable in the slot under the pressure of the grease, and means for reversing the ends of the slot in the casing by turning the plug.

47. In a grease feeder, a grease supply and grease discharge, means forming a passage between the supply and discharge, a plug slidable in said passage under pressure of the grease, a transparent cover over said passage, and means for oscillating said means and reversing the ends of the passage.

48. In a grease feeder, a grease supply receptacle and a discharge therefor, means forming a passage between the receptacle and said discharge, a plug slidable in said passage under the grease pressure, a transparent cover over said passage, and a handle for reversing the ends of said passage by rotating a portion of said means.

49. In a grease feeder, a measuring device having an inlet and an outlet, a rotatable disc with a connecting channel in its face, a plug removably seated in the channel and movable from one end to the other thereof, a transparent cover over the face of the disc, and means for removably holding the cover in place so that it can be removed to insert plugs of different sizes in the channel.

50. The combination of a grease feeder, a measuring device comprising means having a measuring passage, and a piston movable within said passage and another passage without a piston, and means for rotating the first said means so that grease will flow into either of said passages.

51. The combination of a grease feeder, and a measuring device therefor comprising a rotatable member having a diametric measuring passage, and a piston movable in said passage and another passage at one side of the other passage free from obstruction, and means for rotating said member so that grease will flow into the measuring passage in either direction but through the other passage in one direction only.

52. In a grease feeder, the combination with a lubricant receptacle, of means for putting the lubricant under pressure, a conducting member adapted to be mounted on a bearing to be lubricated, detachable means for connecting the receptacle to the conducting member, and manually controlled means for injecting a predetermined amount of the lubricant under pressure into the bearing.

53. The combination with lubricant supply means including means for placing lubricant under pressure, of a conducting member adapted to be mounted on one of a plurality of bearings to be lubricated and a detachable device for connecting the lubricant supply means to the conducting member, the device including separate means for releasing the entire volume of a predetermined amount of the lubricant under pressure to the bearing at each actuation of the device.

54. In a grease feeder, the combination with a source of lubricant supply, a conducting member adapted to be mounted in connection with a bearing to receive the lubricant, a detachable lubricant feeding connection for the conducting member, means including a reciprocating grease feeding plug for injecting a predetermined *quantity* of grease into the bearing, a source of pressure for feeding the grease to the plug, and separate manual actuating means for causing the grease pressure to actuate the plug to give a pressure discharge and to feed the entire predetermined amount of the lubricant to the bearing.

55. A lubricant supply system comprising a fitting adapted to be detachably connected to any one of a plurality of bearings, a supply of lubricant, means for placing the lubricant under pressure in the fitting, means for predetermining an amount of lubricant the entire amount of which is to be discharged from the fitting by the pressure on the lubricant, and manually operated releasing means for delivering this predetermined amount of lubricant from the fitting to a bearing while the lubricant is under pressure.

56. The combination with a source of lubricant supply of a delivery controlling device for the lubricant comprising a device having a plurality of passages therethrough, said passage being selectively registerable with the lubricant source, a piston movable in one of said passages, and means for moving said device selectively to register said passages with said source.

57. In a grease gun detachably connectible to one of a plurality of bearings to be lubricated, a source of grease supply, means for generating pressure and means actuated by said pressure for automatically injecting a fixed quantity of said grease into said bearing.

58. In a grease gun detachably connectible to one of a plurality of bearings to be lubricated, a source of grease supply under pressure, and means actuated by said pressure for automatically injecting a fixed quantity of said grease into said bearing.

59. In a grease gun detachably connectible to one of a plurality of bearings to be lubricated, a source of grease supply under pressure, and means under the control of the operator actuated by said pressure for automatically injecting a fixed quantity of said grease into said bearing.

60. A grease feeder for a mechanism having a plurality of receptacles for receiving the grease comprising means for supplying grease under pressure, a quick detachable connection for engaging the feeder with any one of the receptacles, and means within the lubricant supply for delivering a predetermined amount of lubricant under pressure to each receptacle.

61. A lubricant feeder for a mechanism having a plurality of bearings comprising lubricant pressure supply means, attaching means for connecting the feeder to any bearing and controlling means for admitting a predetermined amount of lubricant under full pressure to a bearing and shutting off the lubricant supply, thereby operating as an explosive force of limited volume when delivering lubricant to a bearing.

In witness whereof, I have affixed my signature.

WILLIAM L. MORRIS.

CERTIFICATE OF CORRECTION.

Reissue Patent No. 18,123. Granted July 7, 1931, to

WILLIAM L. MORRIS.

It is hereby certified that error appears in the printed specification of the above numbered patent requiring correction as follows: Page 5, line 40, for "top" read up; page 6, line 96, claim 13, strike out the word "including"; page 10, line 19, claim 56, for "passage" read passages; and that the said Letters Patent should be read with these corrections therein that the same may conform to the record of the case in the Patent Office.

Signed and sealed this 29th day of September, A. D. 1931.

M. J. Moore,
Acting Commissioner of Patents.

(Seal)